(12) United States Patent
Crum

(10) Patent No.: US 6,947,777 B2
(45) Date of Patent: Sep. 20, 2005

(54) COMPACT ELECTRONIC COMMUNICATION DEVICE WITH SELF-MOUNTING FEATURE AND METHOD OF REMOVABLY COUPLING SUCH A DEVICE TO A SURFACE

(75) Inventor: Jesse D. Crum, Fort Scott, KS (US)

(73) Assignee: Ward-Kraft, Inc., Fort Scott, KS (US)

( * ) Notice: Subject to any disclaimer, the term of this patent is extended or adjusted under 35 U.S.C. 154(b) by 201 days.

(21) Appl. No.: 10/065,463

(22) Filed: Oct. 21, 2002

(65) Prior Publication Data

US 2004/0077388 A1 Apr. 22, 2004

Related U.S. Application Data

(60) Provisional application No. 60/386,211, filed on Oct. 16, 2002.

(51) Int. Cl.$^7$ .................................................. H04M 1/00
(52) U.S. Cl. ............................... 455/575.3; 455/550.1; 455/90.3
(58) Field of Search ........................... 455/575.3, 90.1, 455/90.3, 550.1; 379/428.01, 428.02, 428.04, 429, 430, 433.01, 433.03, 493.04

(56) References Cited

U.S. PATENT DOCUMENTS

| 4,598,275 A | 7/1986 | Ross et al. |
| 4,862,160 A | 8/1989 | Ekchian et al. |
| 4,910,499 A | 3/1990 | Benge et al. |
| 4,967,185 A | 10/1990 | Montean |
| 5,497,140 A | 3/1996 | Tuttle |
| 5,528,222 A | 6/1996 | Moskowitz et al. |
| 5,574,431 A | 11/1996 | McKeown et al. |
| 5,587,703 A | 12/1996 | Dumont |
| 5,646,592 A | 7/1997 | Tuttle |
| 5,660,663 A | 8/1997 | Chamberlain et al. |
| 5,751,256 A | 5/1998 | McDonough et al. |

(Continued)

FOREIGN PATENT DOCUMENTS

| WO | WO0223928 | 3/2002 |
| WO | WO0251175 | 6/2002 |

Primary Examiner—Cong Van Tran
(74) Attorney, Agent, or Firm—Hovey Williams LLP

(57) ABSTRACT

A method and mounting assembly for mounting an electronic communication device having electronic circuitry to a surface is described, wherein the mounting assembly is associated with a back face of the electronic communication device. In a first preferred embodiment, the mounting assembly is a magnetic material associated with the back face of the electronic communication device. The magnetic material is magnetically influenced such that a magnetic field produced by the magnetic material emanates away from the back face of the electronic communication device. In an alternative first preferred embodiment, a synthetic resin laminate shield is intermediately placed between the back surface of the electronic communication device and the magnetic material for further insulating protection from the magnetic field of the magnetic material. In a second preferred embodiment, the back surface of the electronic communication device is provided with a repositionable adhesive. A silicone release layer is positioned on the repositionable adhesive for removal by the user and mounting of the electronic communication device on the surface.

17 Claims, 5 Drawing Sheets

U.S. PATENT DOCUMENTS

| | | |
|---|---|---|
| 5,754,110 A | 5/1998 | Appalucci et al. |
| 5,838,253 A | 11/1998 | Wurz et al. |
| 5,845,218 A | 12/1998 | Altschul |
| 5,867,102 A | 2/1999 | Souder et al. |
| 5,875,393 A | 2/1999 | Altschul et al. |
| 5,920,287 A | 7/1999 | Belcher et al. |
| 5,936,527 A | 8/1999 | Isaacman et al. |
| 5,941,451 A | 8/1999 | Dexter |
| 5,965,848 A * | 10/1999 | Altschul et al. ............ 174/254 |
| 5,973,600 A | 10/1999 | Mosher, Jr. |
| 5,982,284 A | 11/1999 | Baldwin et al. |
| 5,983,094 A | 11/1999 | Altschul et al. |
| 6,019,865 A | 2/2000 | Palmer et al. |
| 6,061,580 A | 5/2000 | Altschul et al. |
| 6,127,928 A | 10/2000 | Issacman et al. |
| 6,144,847 A | 11/2000 | Altschul et al. |
| 6,351,629 B1 | 2/2002 | Altschul et al. |
| 6,384,727 B1 | 5/2002 | Diprizio et al. |
| 6,405,031 B1 | 6/2002 | Altschul et al. |
| 6,405,056 B1 | 6/2002 | Altschul et al. |
| 6,452,566 B1 | 9/2002 | Altschul |
| 6,453,155 B1 | 9/2002 | Hill et al. |

* cited by examiner

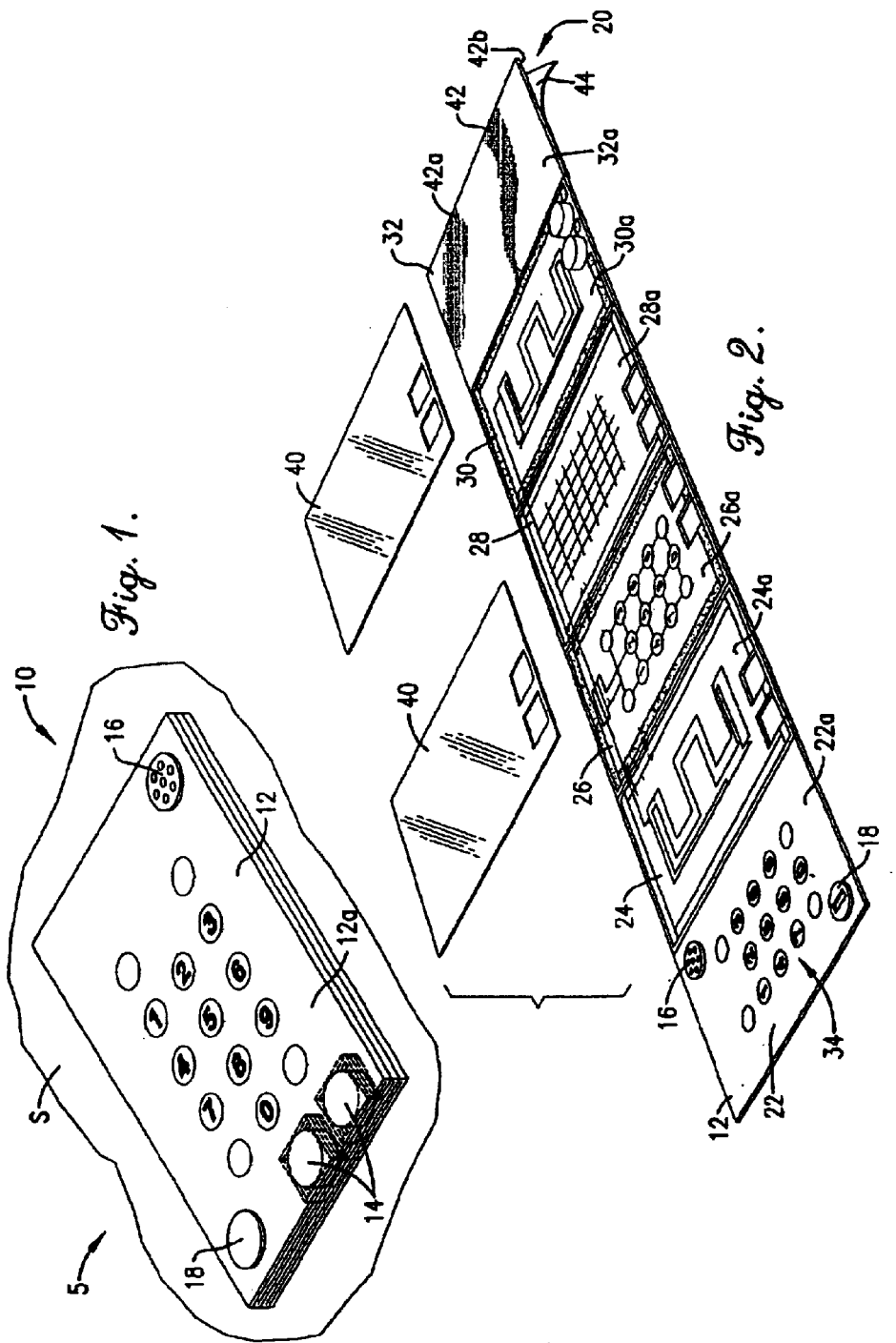

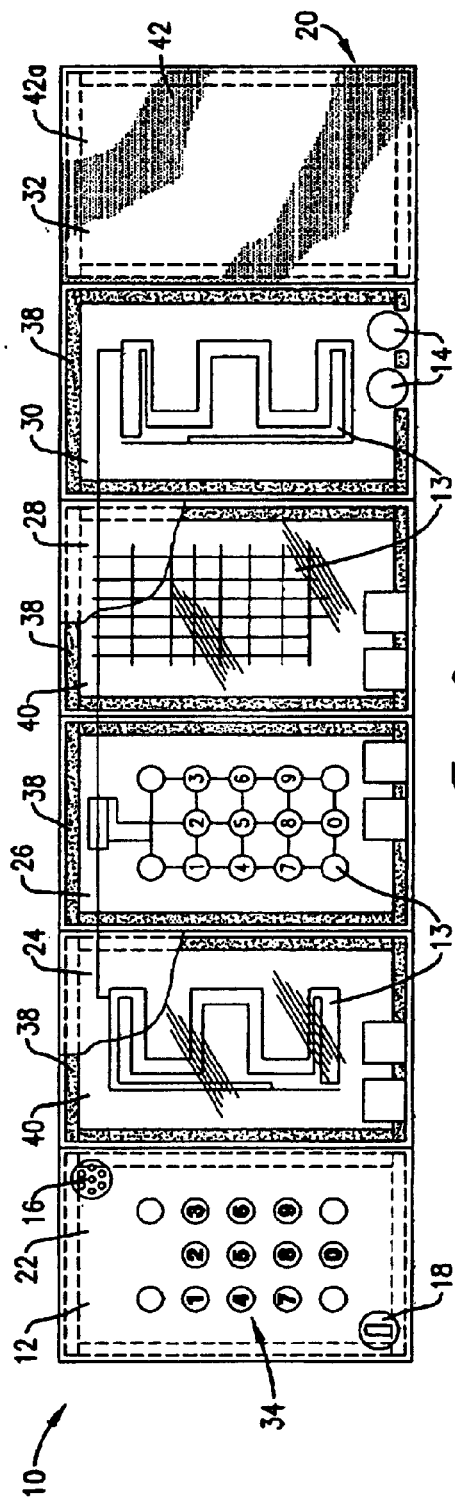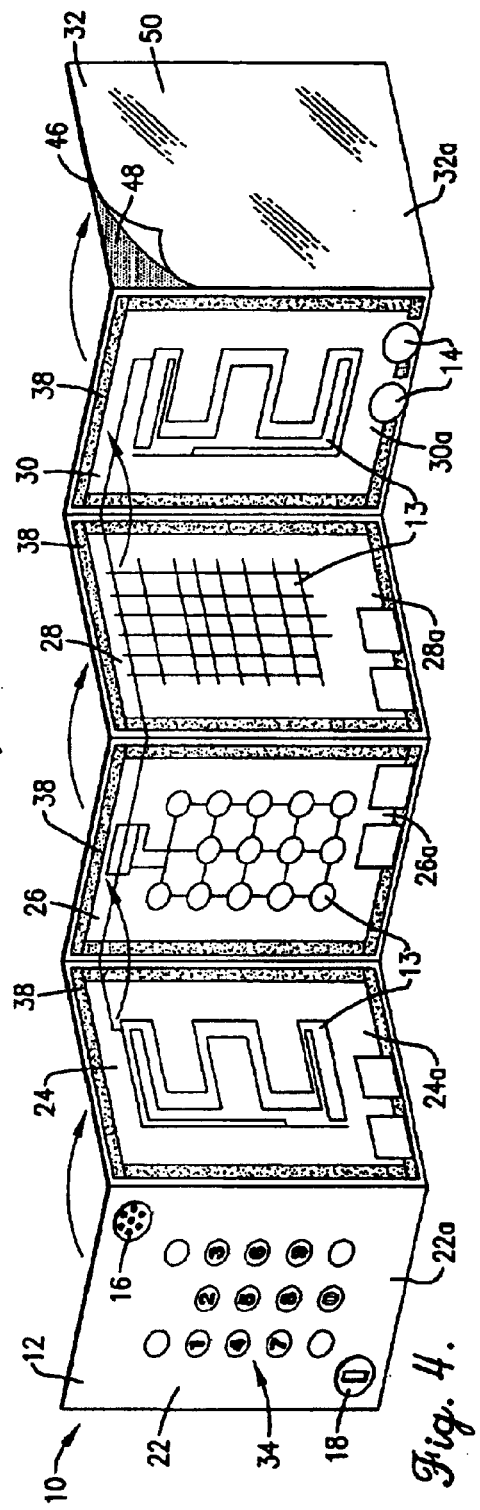

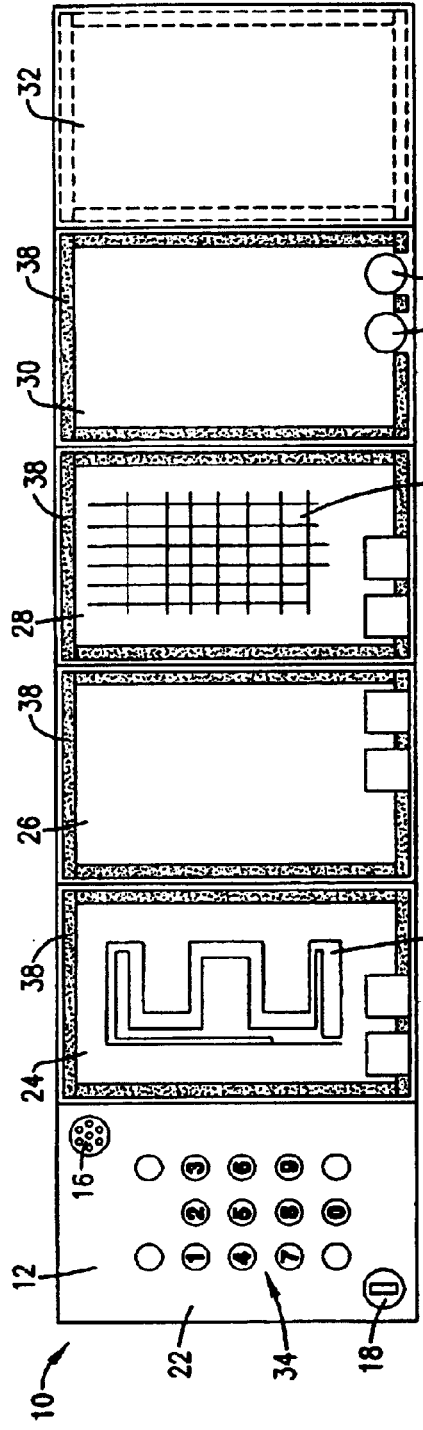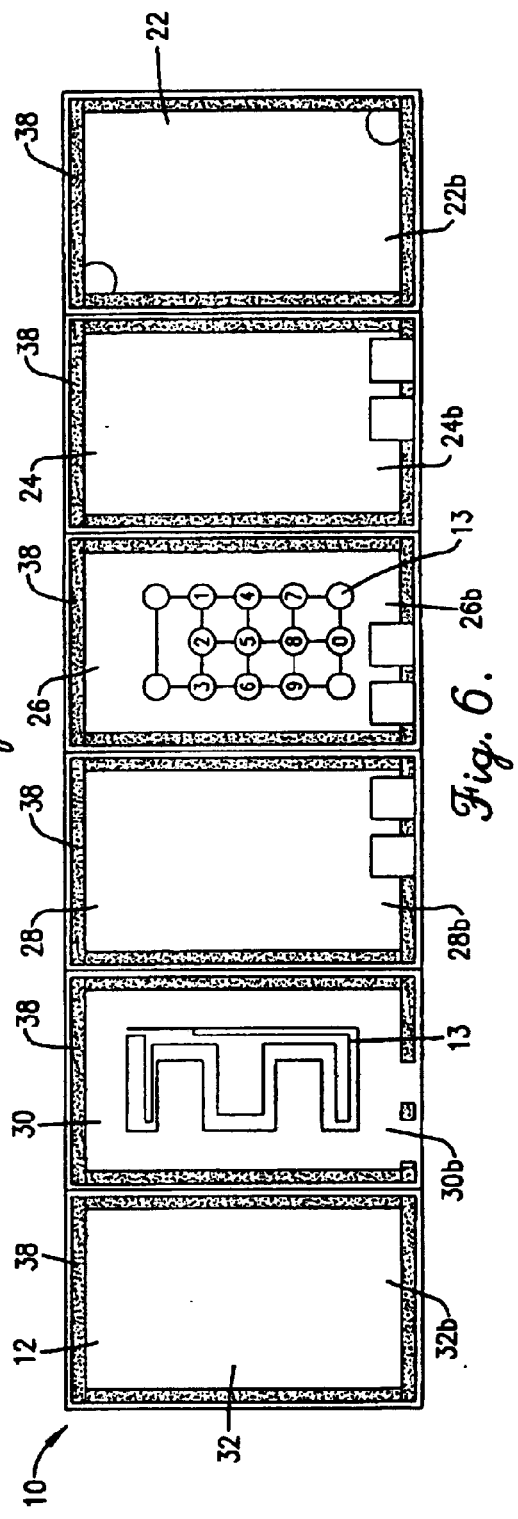

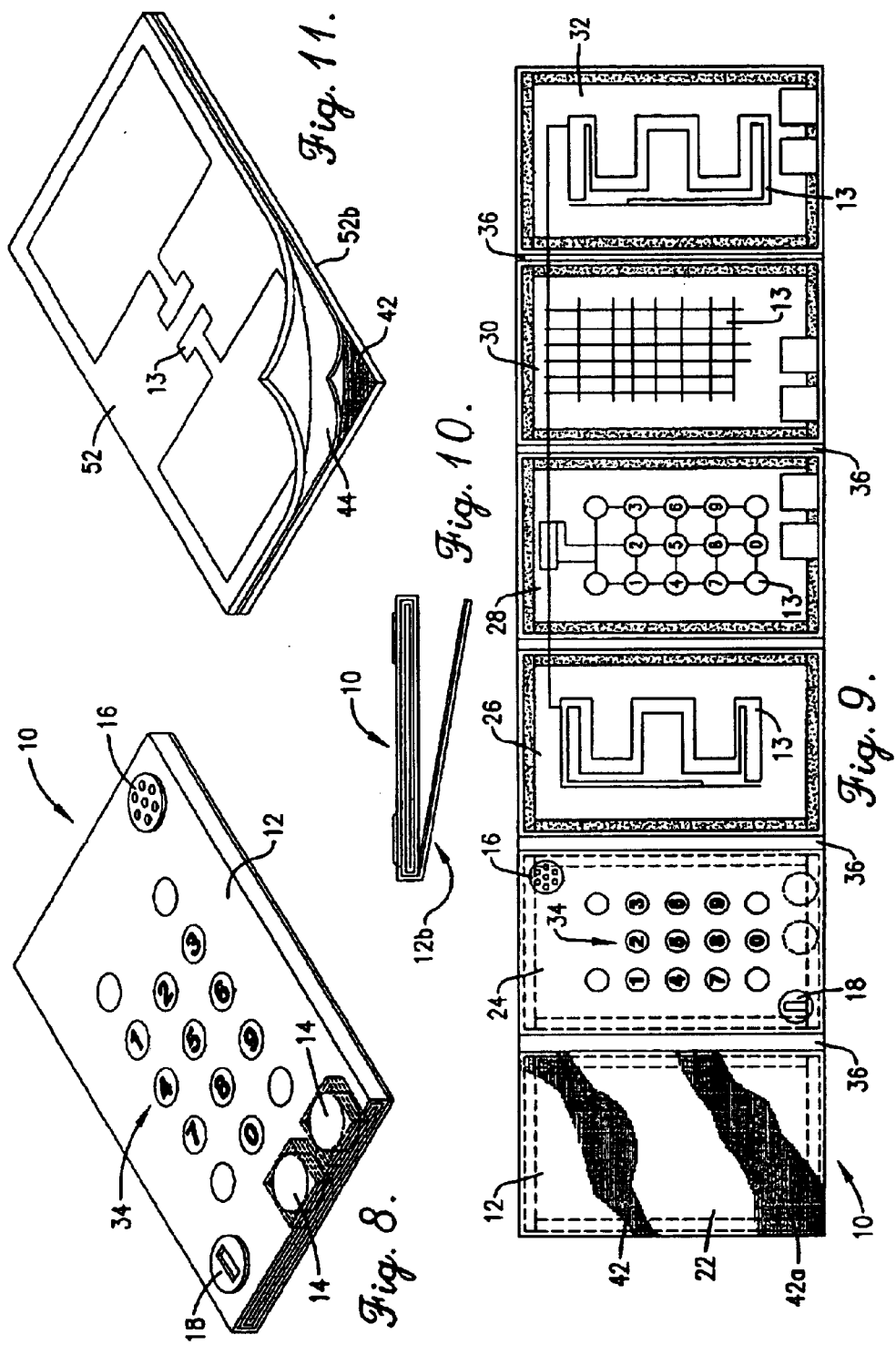

COMPACT ELECTRONIC COMMUNICATION DEVICE WITH SELF-MOUNTING FEATURE AND METHOD OF REMOVABLY COUPLING SUCH A DEVICE TO A SURFACE

RELATED APPLICATIONS

This application claims the benefit of U.S. Provisional Application Ser. No. 60/386,211, filed Oct. 16, 2002.

BACKGROUND OF INVENTION

1. Field of the Invention

The present invention relates to removably coupling compact electronic communication devices to a surface. More particularly, the present invention relates to such an electronic device having a self-mounting feature whereby it may be removably coupled to the surface using a magnet assembly or a repositionable adhesive.

2. Description of the Prior Art

Portable electronic communication devices are well known in the art. Examples broadly include radios, pagers, telephones, and transponders, which have the ability to receive and transmit information. One problem presented by electronic communication devices in connection with mounting has been the weight of the device, which has necessitated mechanical couplers. Newly developed electronic communication devices are more compact, yet have nonetheless required mechanical couplers to provide mounting support to an upright surface.

Accordingly, there is a need for a method and assembly that overcomes the limitations of the prior art. Specifically, there is a need for a mounting assembly that is operable to removably secure an electronic communication device to the upright surface, without affecting electronic circuitry housed within the electronic communication device.

Additionally, there is a need for an assembly that removably couples disposable and portable electronic communication devices, such as a telephone, to any surface.

There is a further need for a mounting assembly which is compact and flush with the body of the electronic communication device and does not require a mechanical coupler.

There is a yet further need for a mounting assembly which can be economically produced so that its cost does not detract from the overall price of a disposable electronic communication device, thereby rendering the user less willing to purchase or dispose of such an electronic communication device.

SUMMARY OF INVENTION

The present invention's method and assembly for removably coupling an electronic communication device to a supporting surface overcomes the above-identified problems and provides a distinct advance in the art of removably coupling electronic communication devices to any surface. More particularly, a first embodiment of the present invention provides a magnet for removably coupling the electronic device to a metal surface, wherein the magnet has a strong enough magnetic field strength to hold the electronic communication device to the surface, but the magnet's magnetic field is low enough so as to not interfere with electronic circuitry housed within the electronic communication device. The magnet may be provided as a relatively thin layer of magnetic material adhered to the back face of the device such that the magnetic material is essentially flush with the body. Advantageously and surprisingly, the field of the magnetic material minimizes, if not completely avoids, interference with the operation of even extremely thin portable wireless electronic communication devices.

In order to achieve this balance, the present invention magnetically influences the magnetic material to a particular magnetic density and magnetic field strength, such that the magnetic field's coercive rings extend and are biased toward the surface on which the electronic communication device is to be placed and away from the surface of the electronic communication device. Alternatively, a synthetic resin laminate is either directly, or by adhesive, applied to a back face of the magnetically influenced magnetic material, and the combination laminate and magnet is affixed to the back face of the electronic communication device. In operation, the laminate acts as a shield against the magnetic field of the magnet. The magnetic field is low enough to not pass through the laminate and affect the electronic circuitry housed within the electronic communication device, but the magnetic field is strong enough to removably secure the electronic communication device to the surface.

A second embodiment of the present invention provides for a mounting assembly for removably mounting or coupling the electronic communication device to any surface, including non-metal surfaces. The mounting assembly includes a repositionable adhesive applied to the back face of the electronic communication device and a liner having a silicon release layer placed on the repositionable adhesive. The silicon release layer is adapted to be removed by a user of the invention for initial placement of the electronic communication device on the surface and, as desired, removal and replacement of the electronic communication device.

The method of the first preferred embodiment includes the steps of: magnetically influencing the thin layer of magnetic material such that the magnetic coercive rings produced by the magnetic field emanate from one face of the magnetic material; and applying the magnetically influenced magnetic material to a back surface of the electronic communication device for placement of the electronic communication device on a metal surface. Alternatively, the present invention includes the steps of: magnetically influencing the thin layer of magnetic material such that the magnetic coercive rings produced by the magnetic field emanate from one face of the magnetic material; applying the synthetic resin laminate to the back face of the magnet; and applying the magnetically influenced magnetic material to the laminate.

The method of the second preferred embodiment includes the steps of: applying the repositionable adhesive to the back face of the electronic communication device; and providing the liner, having the silicon release layer, on the repositionable adhesive.

BRIEF DESCRIPTION OF DRAWINGS

FIG. 1 is a front and a side perspective view of an electronic communication device, particularly a disposable telephone, in accordance with the present invention and showing the telephone folded in an "accordion" style and removably mounted to an upright surface;

FIG. 2 is a front and a side perspective view of an extended form of a first preferred embodiment of the present invention showing polyester layers applied to electronic circuitry and a plurality of panels comprising the telephone, wherein the first panel is printed with a keypad, the second, third, fourth, and fifth panels are printed with the electronic circuitry (the circuitry being depicted only schematically herein), and the sixth panel is a magnet assembly;

FIG. 3 is a front elevational view of the extended form of the telephone and the polyester layers cut-away and illustrating the schematic representation of the electronic circuitry;

FIG. 4 is a front perspective view showing the telephone folded "accordion" style and of a second preferred embodiment illustrating a cardstock layer coated with a repositionable adhesive and a silicone release layer positioned on the repositionable adhesive;

FIG. 5 is a front elevational view of the extended form of the telephone showing an alternative printing option, wherein a front face of the first, second, and fourth panels is printed;

FIG. 6 is a rear elevational view showing the alternative printing option illustrated in FIG. 5 wherein a back face of the second and fourth panels is printed;

FIG. 8 is a front and a side perspective view of the telephone folded "around itself";

FIG. 9 is a front elevational view of the extended form of the telephone showing the panels to be printed when the telephone is to be folded "around itself," as illustrated in FIG. 8;

FIG. 10 is a cross-sectional view showing the telephone folded "around itself";

FIG. 11 is a front and a side perspective view of an alternative electronic communication device, particularly a radio frequency identification ("RFID") tag showing a corner of the RFID tag pulled away to illustrate multiple layers.

DETAILED DESCRIPTION

Figure 7:
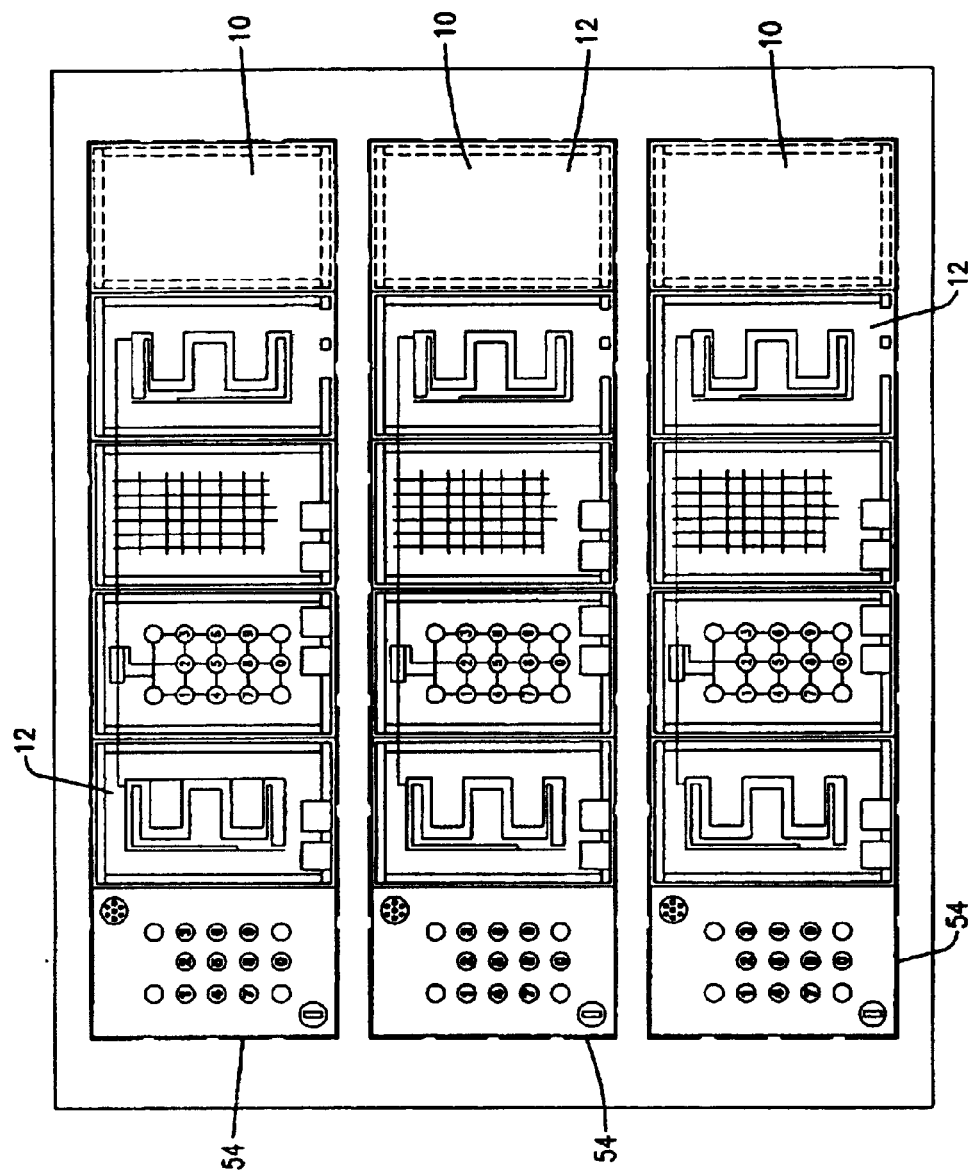
FIG. 7 is a front elevational view showing three telephones printed on a carrier sheet and having lines of weakness surrounding the telephones for removal of the telephone by a user of the present invention.

The invention hereof is directed to removable mounting or coupling of an electronic communication device 5. Such devices 5 permit wireless receipt, and preferably also transmission, of signals for voice or data transmission. The invention hereof is particularly useful in connection with disposable electronic communication devices and one such device 5 is a disposable telephone 10, as shown in FIGS. 1–10. Such a disposable telephone 10 is hereby enabled to be removably coupled to a surface in accordance with a first and a second preferred embodiment of the present invention. However, it is to be understood that the coupling structure and method as described herein may be readily employed on other electronic communication devices, such as radios, pagers, and transponders having wireless telecommunication capability. As illustrated in FIGS. 2 and 3, the disposable telephone 10 is broadly comprised of a body 12 made of a dielectric material printed with conductive ink that diagrams an electronic circuit 13; a power source 14; an earphone 16; a microphone 18; and a magnet assembly 20, as illustrated in FIGS. 2 and 3, for positioning the telephone 10 on the surface.

The body 12, in an assembled condition, has a front face 12a and a back face 12b, as illustrated in FIGS. 1 and 10. The body 12 is preferably composed of cardstock, but may be any dielectric material, such as polypropylene or paper. The cardstock is preferably 3 mil–4 mil in thickness, but the thickness may range between 2 mil and 10 mil. As is known in the art, a dielectric material may be printed with a conductive ink for providing the electronic circuit diagram that includes conductors and other components of a telephone's circuitry, as illustrated in FIG. 3. In the preferred embodiments, a length of cardstock is divided into a plurality of panels, preferably a first panel 22, a second panel 24, a third panel 26, a fourth panel 28, a fifth panel 30, and a sixth panel 32, as illustrated in FIG. 2, each of the panels having respective front faces 22a,24a,26a,28a,30a,32a, as illustrated in FIG. 2, and respective back faces 22b,24b,26b, 28b,30b,32b, as illustrated in FIG. 6. The front face 22a of the first panel 22 is printed with a keypad 34. The front face 24a,26a,28a,30a of the second, third, fourth, and fifth panels 24,26,28,30 of the cardstock is printed with conductive ink arranged so as to diagram an electronic circuit 13 for telephone operation, as illustrated in FIGS. 2–4. Those ordinarily skilled in the art will appreciate that the circuitry 13 has only been depicted schematically herein (e.g., see FIGS. 2–7 and 9). That is, the schematic representations of the circuitry 13 have principally been provided for illustrative purposes only (e.g. to depict the general location of the circuitry, the manner in which it is formed, etc.). Suitable telephone circuitry 13 for a disposable wireless telephone 10 is described in U.S. Pat. Nos. 5,845,218 and 5,875, 393, both assigned to Randice-Lisa Altschul and hereby incorporated by reference. The panels 22,24,26,28,30,32 are joined by a thin webbing material 36, preferably polypropylene, as best illustrated in FIG. 9. The panels 22,24,26,28,30,32 are adapted to be folded onto each other such that the electronic circuitry 13 is precisely aligned. Optimal folding techniques and securement of the panels 22,24,26,28,30,32 are described below.

The power source 14 for the telephone 10 is preferably two, but at least one, batteries preferably affixed to the fifth panel 30, as illustrated in FIG. 2. The power source 14 is preferably a small, thin battery, such as a disk battery, a flat battery, a pouch battery, or a paper battery. Alternatively, the power source 14 may be any power source suitable for small, disposable electronic communication devices. The power source 14 may also be solar power or a remote housing including a battery. Corresponding areas of the second, third, and fourth panels 24,26,28 are removed or cut out where the power source 14 will be positioned when the body 12 is folded, such that when folded, the body 12 is substantially flat with no obtrusions.

The earphone 16 and the microphone 18 are preferably secured to the first panel 22 after the body 12 is printed. Once folded, the earphone 16 is preferably secured to an upper portion of the telephone 10 and preferably offset to the right side of the telephone 10. The microphone 18 is preferably secured to a lower portion of the telephone 10 and preferably offset to the left side of the telephone 10. The earphone 16 and the microphone 18 may also be remotely connected to the telephone 10. As described below and illustrated in FIG. 9, the body 12 may be folded such that the second panel 24 is printed with the keypad 34. For this alternative, the earphone 16 and the microphone 18 are similarly positioned on the second panel 24.

A disposable electronic communication device, particularly a telephone, and a method for making is described in U.S. Pat. No. 5,965,848 assigned to Randice-Lisa Altschul and hereby incorporated by reference.

In operation, a user of the telephone 10 may receive the telephone 10 in an extended form, as illustrated in FIGS. 2–6, and the user must fold the telephone 10 into a workable device. As noted above, it is necessary that the panels 22,24,26,28,30 of the telephone 10 are precisely folded so that when the user depresses a key on the the body 12 of the telephone 10 must include a fastening means for securing the panels 22,24,26,28,30 together. Preferably, the fastening means is an adhesive, most preferably a cohesive 38, as illustrated in FIGS. 5 and 6, positioned on an outer edge of the front face 24a,26a,28a,30a of the second, third, fourth, and fifth panels 24,26,28,30, and the back face 22b,24b,26b, 28b of the first, second, third, and fourth panels 22,24,26,28. In this manner, the body 12 of the telephone 10 may be folded in an "accordion" style or "fan" style, as illustrated in FIG. 4, such that the back face 22b of the first panel 22 is affixed to the back face 24b of the second panel 24, the front face 24a of the second panel 24 is affixed to the front face 26a of the third panel 26, etc. Most preferably, cohesive 38 is used, as opposed to adhesive, so that the panels 22,24, 26,28,30 of the body 12 will not unintentionally affix to any surface.

The panels 22,24,26,28,30 may be printed in one of two options to allow for correct operation of the printed electronic circuitry 13. FIGS. 5 and 6 illustrate a first option, wherein the front face 22a,24a,28a of the first, second, and fourth panels 22,24,28 is printed, and the back face 26b,30b of the third and fifth panels 26,30 is printed. With this option, when folded "accordion" style, no two panels having printed electronic circuitry 13 are in contact with each other, which prevents the electronic circuitry 13 from malfunctioning. Alternatively, the front face 22a,26a,30a of the first, third, and fifth panels 22,26,30 may be printed (not shown), and the back face 24b,28b of the second and fourth panels 24,28 may be printed (not shown).

A second option is to print all electronic circuitry 13 on the front face 22a,24a,26a,28a,30a of each panel 22,24,26, 28,30, as illustrated in FIGS. 2 and 3, and to provide a thin polyester layer 40 between the panels' electronic circuitry 13 to prevent malfunctions. Since, for example, the second and third panels' electronic circuitry 13 are in contact, the thin polyester layer 40 is preferably applied to the front face 24a,26a of either the second or third panels 24,26, but preferably the front face 26a of the third panel 26. Similarly, the thin polyester layer 40 is preferably applied to the front face 28a of the fourth panel 28 to prevent contact between the fourth and fifth panels' electronic circuitry 13.

In accordance with a first preferred embodiment of the present invention, a sixth and final panel 32 of the telephone 10 is positioned proximately adjacent to the fifth panel 30 and connected to the fifth panel 30 using the thin webbing material 36 that joins the other five panels 22,24,26,28,30, as illustrated in FIG. 9. Preferably, the sixth panel 32 is a thin, flexible magnetic material 42, such as those synthetic or natural rubbers having ferrite particles embedded therein, as illustrated in FIG. 3.

The magnetic material 42 is between 4 mil and 16 mil in thickness and more preferably approximately 8 mil in thickness. The magnetic material 42 may be any thin, flexible magnetic material, such as that manufactured by Magnum Magnetics of Marietta, Ohio, or Precision Web Coating of Dayton, Ohio, and available from Magnetic Specialities, Inc. of Marietta, Ohio. The magnetic material 42 is preferably magnetically influenced by passing the material 42 through a magnetic influencer with an air gap of 0.005 to 0.010 inch between the influencer and the magnetic material 42. Referring to FIG. 3, once magnetized, the magnetic material 42 functions as a magnet that produces a magnetic field with a magnetic density of 10–24 poles per inch, but preferably 14 poles per inch, and a resulting field strength of 85 gauss for each pole as measured at a distance 0.004 inches from a front face 42a of the magnetic material 42, 75 gauss as measured at a distance of 0.0065 inches from the front face 42a of the magnetic material 42, and 65 gauss as measured at a distance of 0.015 inches from the front face 42a of the magnetic material 42. The magnetic field of the magnetic material 42 also substantially emanates out from the front face 42a of the magnetic material 42, as opposed to the magnetic field emanating towards the back face 12b of the body 12 once the telephone 10 is folded. This is particularly necessary to prevent the electronic circuitry 13 of the telephone 10 from malfunctioning due to the magnetic field adversely affecting the electronic circuitry 13.

Alternatively, the sixth panel 32 of the first preferred embodiment may include two layers, as illustrated in FIG. 2, wherein a first layer is the thin, flexible magnetic material 42 magnetically influenced as described above, and a second layer is a thin synthetic resin laminate 44 shield, such as polyester or vinyl. The synthetic resin laminate 44 is preferably between 0.5 mil and 16 mil in thickness and more preferably 2 mil in thickness. The laminate 44 is preferably applied on the back face 42b of the magnetic material 42 by applying a thin coating directly on the back face 42b of the magnetic material 42 or by use of an intermediate adhesive layer (not shown). When the body 12 is folded, the laminate 44 is proximately adjacent to the back face 30b of the fifth panel 30. The laminate 44 is secured to the back face 30b of the fifth panel 30 using an adhesive layer positioned between the laminate 44 and the back face 30b of the fifth panel 30. Alternatively, the laminate 44 and the fifth panel 30 are secured together using cohesive 38 placed on an outer edge of the laminate 44 and corresponding cohesive 38 placed on the back face 30b of the fifth panel 30, such that the cohesive 38 on the outer edge of the back face 30b of the fifth panel 30 is in contact with the cohesive 38 on the laminate 44.

In combination, the synthetic resin laminate 44 applied to the back face 42b of the magnetic material 42 acts as a shield from the magnet's magnetic field, resulting in a very low or almost undetectable magnetic field strength as measured from the back face 42b of the magnetic material 42. This is especially important since it is the back face 42b of the magnetic material 42 that is in contact with the printed electronic circuitry 13 of the four panels 24,26,28,30. Therefore, in order to couple the magnetic material 42 with the telephone 10 without interfering with the electronic circuitry 13, the magnetic field of the magnetic material 42 must not emanate towards the electronic circuitry 13. To remedy this problem, the present invention affixes the laminate 44 to the back face 42b of the magnetic material 42 and produces a magnetic field of relatively low strength, such that the electronic circuitry 13 is operable, and the magnetic material 42 is still capable of removably coupling the telephone 10 to the surface.

In accordance with a second preferred embodiment of the present invention, and as illustrated in FIG. 4, the sixth panel 32 may be provided with a repositionable adhesive 48 applied directly to the front face 32a of the sixth panel 32 and a liner having a silicone release coating 50 covering the repositionable adhesive 48, such that the user of the present invention may remove the silicone release layer 50 and position the telephone 10 on the surface. The repositionable adhesive is such as manufactured by Forbo Adhesives of Durham, N.C., product number 2550. Once folded, the sixth panel 32 is secured to the back face 30b of the fifth panel 30 using cohesive 38 applied to an outer edge of the back face 30b of the fifth panel and the back face 32b of the sixth panel.

The first and second embodiments may also be folded in an alternative form, such as folding the extended form of the telephone 10 "around itself," as best illustrated in FIGS. 8 and 10. As illustrated in FIG. 9, the front face 24a,26a,28a, 30a,32a of the second, third, fourth, fifth, and sixth panels 24,26,28,30,32 may be printed. Alternatively, the front face 24a,28a,32a of the second, fourth, and sixth panels 24,28,32 may be printed (not shown), and the back face 22b,26b,30b of the first, third, and fifth panels 22,26,30 may be printed (not shown). To secure the panels 22,24,26,28,30,32 together once folded, cohesive 38 may be applied to an outer edge of each opposing panel.

The present invention may also be used with other electronic communication devices 5, such as radio frequency identification ("RFID") devices, including RFID tags 52, which function as transponders or transmitters. Examples of suitable RFID devices as electronic communication devices 5 or methods of using such are shown and described in the following U.S. Patents, the disclosures of which are incorporated herein by reference: U.S. Pat. No. 6,127,928 assigned to E-Tag Systems, Inc.; U.S. Pat. No. 6,019,865 assigned to Moore U.S.A. Inc.; U.S. Pat. No. 5,920,287 assigned to Widata Corporation; U.S. Pat. No. 5,936,527 assigned to E-Tag Systems, Inc.; U.S. Pat. No. 5,838,253 assigned to Accu-Sort Systems, Inc.; U.S. Pat. No. 5,528,222 assigned to International Business Machines Corporation; and U.S. Pat. No. 5,497,140 assigned to Micron Technology, Inc.

Recent technological advances have furthered RFID technology by developing an RFID tag 52 broadly comprised of paper printed with conductive ink and a silicone microprocessor, as illustrated in FIG. 11. Instead of using conductive wire, capacitively coupled RFID tags, as they are known in the art, use conductive ink to transmit a radio signal, which allows for smaller and less expensive tags. Such capacitively coupled RFID tags 52 are manufactured by Motorola, Inc. of Schaumburg, Ill., under the tradename BISTATIX and are shown and described in U.S. Pat. No. 6,384,727 B1 assigned to Motorola, Inc. As with conventional RFID tags, capacitively coupled RFID tags 52 have electronic circuitry 13 that interferes with any magnetic material 42 positioned proximately adjacent to the circuitry 13. The present invention is operable to prevent this interference by magnetically influencing the magnetic material 42, as described above, so that the magnetic material's magnetic field emanates away from a back face 52b of the RFID tag 52. Alternatively, the thin synthetic resin laminate 44 may be intermediately provided between the back face 52b of the RFID tag 52 and the magnetic material 42. As with the disposable telephone 10, the laminate 44 acts as a shield against the magnetic field produced by the magnetic material 42, and thus prevents interference of the electronic circuitry 13 with the magnetic field.

The present invention is preferably mounted on a substantially smooth upright surface, such as a refrigerator or wall, as illustrated in FIG. 1. Since the present invention is adapted to be mounted without a mechanical mounting, the electronic communication device may be placed quickly and easily on the upright surface such that the electronic communication device 5 is substantially flush with the surface. In the above-described preferred first embodiment, the telephone 10 may alternatively be programmed with a single telephone number, such that the telephone 10 is operable to only call that number. The body 12 of the telephone 10 may also be printed with promotional indicia for marketing or advertising. Since the telephone 10 is disposable, companies could use the telephone 10 as a marketing tool, such that a user, for example, would mount the telephone 10 to their refrigerator and call the company directly using the telephone 10.

The repositionable adhesive 48 described in the second preferred embodiment is particularly adapted for securement of the electronic communication device 5 to any surface. Since the present invention is operable to self-mount the device 5, a mechanical mount need not be used to mount the device 5 on, for example, a dashboard of a car. The self-mounting feature of the present invention thus reduces the cost of having to buy and install the mechanical mount. Also, the present invention does not damage the surface to which it is mounted, as opposed to some mechanical mounts.

Although preferred forms of the invention have been described above, it is to be recognized that such disclosure is by way of illustration only and should not be utilized in a limiting sense in interpreting the scope of the present invention. Obvious modifications to the exemplary embodiments, as hereinabove set forth, could be readily made by those skilled in the art without departing from the spirit of the present invention. For example, the present invention may be used with a variety of electronic communication devices 5, such as a GPS unit, a calculator, or an electronic game. A plurality of the present invention may also be provided on a carrier sheet, preferably three telephones 10 to each sheet. An outer edge of the extended body 12 is provided with score lines or lines of weakness 54, as illustrated in FIG. 7, so that the user of the invention may easily remove the body 12 from the carrier sheet and fold the body 12 into a workable telephone 10.

Additionally, the dielectric material used to form the body 12 of the electronic communication device 5 may be folded in a different manner from those described above. The body 12 of the device 5 may also comprise one solid piece not formed of a folded material. Additionally, it is not essential that the body 12 be disposable, since the present invention is operable to be used with any thin-bodied electronic communication device 5. The body 12 may also be wrapped to protect it from water or normal use, such as wrapping the body in shrink wrap.

Having thus described the preferred embodiment of the invention, what is claimed as new and desired to be protected by Letters Patent includes the following:

1. In combination:
   an electronic communication device having electronic circuitry adapted for wireless transmission and/or reception of communication signals, said device further including a body having a front surface adapted for the input or output of information corresponding to said signals to be transmitted and/or received and a back surface; and
   mounting material coupled to one of said front surface and said back surface in substantially laminate relationship thereto for providing removable non-mechanical mounting of said device in self-supporting relationship to a supporting surface,
   wherein the mounting material is a magnetic material between 4 mil and 16 mil in thickness,
   wherein the magnetic material is magnetically influenced such that the magnetic density is about 14 poles per inch with a resulting magnetic field strength of about 85 gauss for each pole when measured at a distance of about 0.004 inches from the magnetic material, about 75 gauss for each pole when measured at a distance of about 0.0065 inches from the magnetic material, and about 65 gauss for each pole when measured at a distance of about 0.015 inches from the magnetic material.

2. The combination as set forth in claim 1, wherein the electronic communication device is a disposable and portable device which includes a folded dielectric material.

3. The combination as set forth in claim 2, wherein the dielectric material is between 2 mil and 10 mil in thickness.

4. The combination as set forth in claim 1, wherein the mounting material is coupled to the back side for mounting the device adjacent to a separate supporting surface.

5. A magnetic material coupled to an electronic communication device for self-mounting said electronic communication device, wherein the magnetic material is magnetically influenced such that the magnetic density is about 14 poles per inch with a resulting magnetic field strength of about 85 gauss for each pole when measured at a distance of about 0.004 inches from the magnetic material, about 75 gauss for each pole when measured at a distance of about 0.0065 inches from the magnetic material, and about 65 gauss for each pole when measured at a distance of about 0.015 inches form the magnetic material.

6. The magnetic material as set forth in claim 5, wherein the magnetic material is between 4 mil and 16 mil in thickness.

7. The magnetic material as set forth in claim 5, wherein the magnetic material is coupled to a back face of the electronic communication device using adhesive.

8. The magnetic material as set forth in claim 5, wherein a magnetic field produced by the magnetic material emanates predominantly away from the back face of the electronic communication device.

9. In an eletronic communication device adapted for wireless reception and/or transmission of signals, said device having a body with a front surface adapted for the input and/or output of information corresponding to said signals and a back surface, the improvement comprising a thin non-mechanical coupling material associated with the back face of the body which renders the device self-supporting when the device is attached to an upright surface, wherein the coupling material is a magnet assembly coupled to one of the front surface and the back surface for self-mounting said electronic communication device to a surface in self-supporting relationship, the magnet assembly comprising:

a shield associated with a back surface of the electronic communication device, wherein the shield is adapted to provide electromagnetic protection to electronic circuitry housed within the device from a magnetic field; and a magnetic material coupled with the shield opposite the electronic circuitry, wherein the magnetic material is magnetically influenced so as to produce said magnetic field.

10. The device as set forth in claim 9, wherein the electronic communication device is disposable and portable and wherein the body includes a folded dielectric material, and the dielectric material is between 2 mil and 10 mil in thickness.

11. The device as set forth in claim 9, wherein the electronic communication device is a radio frequency identification tag.

12. The device as set forth in claim 9, wherein the electronic communication device is a telecommunication device for receiving and transmitting signals.

13. The device as set forth in claim 9, wherein the shield is a synthetic resin laminate adhesively coupled to the device.

14. The device as set forth in claim 9, wherein the magnetic material is between 4 mil and 16 mil in thickness and relatively thinner than the thickness of the body of the device.

15. The device as set forth in claim 9, wherein the magnetic material is magnetically influenced such that the magnetic density is about 14 poles per inch with a resulting magnetic field strength of about 85 gauss for each pole when measured at a distance of about 0.004 inches from the magnetic material, about 75 gauss for each pole when measured at a distance of about 0.0065 inches from the magnetic material, and about 65 gauss for each pole when measured at a distance of about 0.015 inches form the magnetic material.

16. A method for removably mounting to a surface an electronic communication device having a body including a back surface and a front surface adapted for the input or output of information to or from the device and electronic circuitry, the method comprising the steps of:

magnetically influencing a magnetic material to a magnetic field density of about 14 poles per inch resulting in a magnetic field strength of about 85 gauss for each pole when measured at a distance of about 0.004 inches from the magnetic material, about 75 gauss for each pole when measured at a distance of about 0.0065 inches from the magnetic material, and about 65 gauss for each pole when measured at a distance of about 0.015 inches from the magnetic material; and associating the magnetically influenced magnetic material with the back surface of the electronic communication device.

17. The method as set forth in claim 16, wherein the body of the electronic communication device includes a folded dielectric material between about 2 mil and 10 mil in thickness.

* * * * *